US011143342B2

(12) United States Patent
Kerg et al.

(10) Patent No.: US 11,143,342 B2
(45) Date of Patent: Oct. 12, 2021

(54) PART FOR COAXIAL CONNECTION OF TWO TUBES

(71) Applicant: Valeo Systemes Thermiques, Le Mesnil Saint Denis (FR)

(72) Inventors: Philippe Kerg, Le Mesnil Saint Dennis (FR); Morgan Le Goff, Le Mesnil Saint Dennis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 196 days.

(21) Appl. No.: 15/528,940

(22) PCT Filed: Oct. 28, 2015

(86) PCT No.: PCT/EP2015/074932
§ 371 (c)(1),
(2) Date: May 23, 2017

(87) PCT Pub. No.: WO2016/083057
PCT Pub. Date: Jun. 2, 2016

(65) Prior Publication Data
US 2017/0314718 A1    Nov. 2, 2017

(30) Foreign Application Priority Data

Nov. 28, 2014 (FR) ...................... 1461666

(51) Int. Cl.
*F16L 23/04*   (2006.01)
*F16L 21/06*   (2006.01)
*F16L 37/12*   (2006.01)

(52) U.S. Cl.
CPC ............... *F16L 23/04* (2013.01); *F16L 21/06* (2013.01); *F16L 37/1225* (2013.01); *Y10T 29/49826* (2015.01)

(58) Field of Classification Search
CPC ..... F16L 37/1225; F16L 37/144; F16L 17/04; F16L 21/06; F16L 23/10; F16L 23/06
(Continued)

(56) References Cited

U.S. PATENT DOCUMENTS 3,229,998 A * 1/1966 Pennington ................... 285/419
4,260,181 A * 4/1981 Curtin ....................... 285/419 X
(Continued)

FOREIGN PATENT DOCUMENTS

DE    198 38 588 A1    3/2000
DE    100 29 366 A1    12/2001
(Continued)

OTHER PUBLICATIONS

International Search Report issued in PCT/EP2015/074932 dated Jan. 21, 2016 (3 pages).
(Continued)

*Primary Examiner* — Zachary T Dragicevich
(74) *Attorney, Agent, or Firm* — Osha Bergman Watanabe & Burton LLP

(57) ABSTRACT

A part for coaxial connection of two tubes having two connection portions each provided with an area for receiving a connection element of each tube. The two connection portions capable of sliding inside one another, between a separated position of the two portions and a tightened position of the two portions. The two receiving areas form a closed contour and are capable of holding the connection elements together.

16 Claims, 5 Drawing Sheets

(58) Field of Classification Search
USPC ... 285/81, 93, 319, 325, 406, 419, 420, 364, 285/365, 366, 408, 407, 410
See application file for complete search history.

(56) References Cited

U.S. PATENT DOCUMENTS 4,326,737 A * 4/1982 Lehmann ................ F16L 23/04
5,015,013 A * 5/1991 Nadin ....................... 285/419 X

FOREIGN PATENT DOCUMENTS

| DE | 10 2012 106232 B3 | 12/2013 |
|---|---|---|
| EP | 1 533 558 A1 | 5/2005 |
| EP | 1 746 322 A2 | 1/2007 |
| EP | 2 065 628 A2 | 6/2009 |

OTHER PUBLICATIONS

Written Opinion of the International Searching Authority issued in PCT/EP2015/074932 dated Jan. 21, 2016 (5 pages).

* cited by examiner

PART FOR COAXIAL CONNECTION OF TWO TUBES

FIELD OF THE INVENTION

The present invention relates to a part for coaxial connection of two tubes, in particular for end-to-end connection of two tubes in a fluid circuit, in particular in a motor vehicle. The invention also relates to a device for axial connection of two tubes provided with this part, and a method for axial connection of two tubes which implements said part.

BACKGROUND

Motor vehicles are closed places with a small volume which are subjected to changing environments. It is therefore essential to renew the air in them regularly and regulate their temperature.

For this purpose, conditioning devices, or air conditioning units are used. These systems are designed such that the air which is heated or cooled is blown inside the vehicle.

Conditioning devices for motor vehicles, in particular HVAC (Heating, Ventilation And Air Conditioning) systems, generally comprise an air circuit between at least one intake mouth and at least one discharge mouth on which various means for treatment of the air are interposed. The air intake mouth is an exterior air intake and/or a recycled air intake. The means for treatment of the air are in particular ventilation means in order to put a flow of air into motion through the circuit, heating and/or cooling means, for example a radiator for heating air and an evaporator which is designed to cool the air.

The air heating radiator is connected to tubes, typically tubes which pass through the vehicle front shield in the direction of an engine cooling system.

In general, connection devices of this type are known which are used more particularly to ensure connection to the interior of a liquid coolant circuit in a motor vehicle. For this purpose, a particular application of a device of this type is the connection of an intake or output tube of a heat exchanger, in which the liquid coolant must exchange heat with another medium, and a duct which conveys the fluid into or out of this heat exchanger.

In this case, the term "tube" generally designates any fluid transfer means which comprises at least one tubular part, such as, for example, a pipe, a duct, a joining piece, a brace, etc.

The connection device serves the purpose of thrusting axially towards one another an element for connection of a first tube, such as a collar, and an element for connection of a second tube, such as a roll. In order to reinforce the sealing, an annular seal is clamped in a sealed manner between the two connection elements.

A device 1 of this type is illustrated in FIG. 1. A part 2 in the form of an open clamp, as described for example in document EP 1 533 558, is used for the coaxial connection of a first tube 3, which is a male tube, and of a second tube 4, which is a female tube.

The first tube 3 comprises an end region provided with a peripheral roll 31 which defines an annular rim, whereas the second tube 4 comprises an end region which defines a collar 41 in which the roll 31 engages at least partly. The end regions are designed to cooperate with one another, in this case by fitting together.

In the example, the second tube 4 constitutes an intake or output tube of a heat exchanger, whereas the first tube 3 constitutes a duct which conveys a liquid coolant into or out of this heat exchanger. In a preferred application of the invention, the heat exchanger constitutes a radiator for cooling of a motor vehicle engine, or a radiator for heating the passenger space of such a vehicle.

In order to form a sealed connection between the two tubes 3, 4, an annular seal 5 is inserted during assembly between the collar 41 and the roll 31, the open clamp 2 being designed to thrust the roll 31 and the collar 41 axially towards one another in order to compress the seal 5 and guarantee the sealing.

The connection part 2, in the form of an open clamp, is designed to engage laterally (radial assembly) on the two tubes 3, 4, the end regions of which have been previously fitted together.

This type of connection part has the disadvantage that the assembly is not secure, and it is not possible to pre-assemble the connection part on the two tubes.

The objective of the invention is to eliminate these disadvantages.

The invention thus relates to a part for axial connection of two tubes.

SUMMARY

The part according to the invention comprises at least one connection part provided with an area for receipt of an element for connection of each tube. The part additionally comprises at least one radial return element intended to pre-position the part on an end region of the tubes.

The radial return element or elements make it possible to easily pre-assemble the part on one of the two tubes in the spaced position of the two connection parts.

According to the invention, the part comprises two connection parts, each provided with an area for receipt of an element for connection of each tube. In addition, the two connection parts are able to slide in one another, between a spaced position of the two parts, and a tightened position of the two parts, in which the two receipt areas can hold the connection elements together and form a closed contour, for example by thrusting the connection elements axially towards one another.

Thus, the sliding of the two connection parts in one another makes it possible to define a spaced (open) position, in which the two parts are at a distance from the tubes, and wherein the part can be preassembled on one of the two tubes, and a tightened (closed) position in which the areas for receipt of the two parts thrust the elements for connection of the tubes axially towards one another, which makes it possible to form the connection. In addition, the closed contour formed by joining of the two connection parts in the tightened position makes possible a more secure connection.

Each connection part can comprise a radial return element.

The area for receipt of each connection part can be a groove.

Each connection part can be a half-ring, such that in the tightened position the part forms a ring.

The areas for receipt of the two connection parts can form an annular groove arranged in a radial plane of the part.

The groove can be delimited by two outer borders which can have different radial widths.

Each connection part can comprise a male area which slides in an associated female area of the other part, and a female area in which the male area of the other connection part slides.

The male area of each connection part can comprise at least one arm which slides in at least one rail of the female area of the other connection part.

A boss can be arranged in each rail, such as to keep the two connection parts in a spaced position.

Each connection part can be provided with at least one clip, such that the tightened position of the two connection parts is obtained by clipping.

Each male area can be clipped into its associated female area.

Each connection part can also comprise an element which projects from the periphery of the part, and which is clipped into an opening in the other connection part.

The invention also relates to the use of a part as described above for the axial connection of two tubes.

The invention also relates to a device for coaxial connection of two tubes, by cooperation of an end region of a first tube with an end region of a second tube. The device according to the invention comprises a connection part as described above, and which is arranged around elements for connection of the two tubes.

Each tube comprises a connection element, the connection element of the first tube can be a roll and the connection element of the second tube can be a collar.

The roll of the first tube can be able to be received in the collar of the second tube.

The device can also comprise an annular seal.

Finally, the invention relates to a method for coaxial connection of two tubes by means of a connection part as described above.

In an end region of the two tubes and around the elements for connection of the two tubes, the method comprises a step of sliding of the two connection parts, from a spaced position of the two parts, to a tightened position of the two parts, in which the two areas for receipt of the two parts form a closed contour, and keep the connection elements together, for example by thrusting the connection elements axially towards one another.

Before the step of sliding, the method can comprise a step of pre-positioning of the connection part, in the spaced position of the two connection parts, around an end region of one of the two tubes, in particular by means of each radial return element. It is thus possible to pre-position the part in the spaced position on a female tube, with the method continuing with the insertion of a male tube into the female tube, then by sliding of the two connection parts as far as the tightened position in which the two tubes are connected.

Other objectives, characteristics and advantages of the invention will become apparent from reading the following description, provided purely by way of non-limiting example, and with reference to the appended drawings.

DETAILED DESCRIPTION

Figure 1:
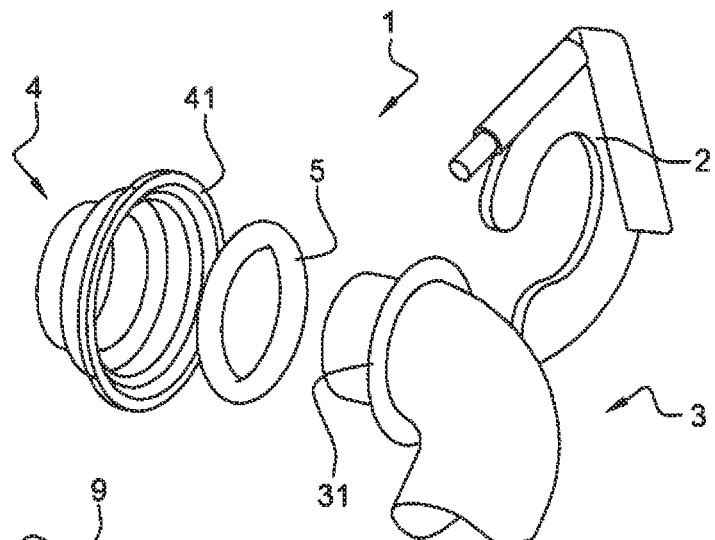
FIG. 1, already described, is a partial exploded view of a device for coaxial connection of two tubes using a connection part according to the prior art.
Figure 2:
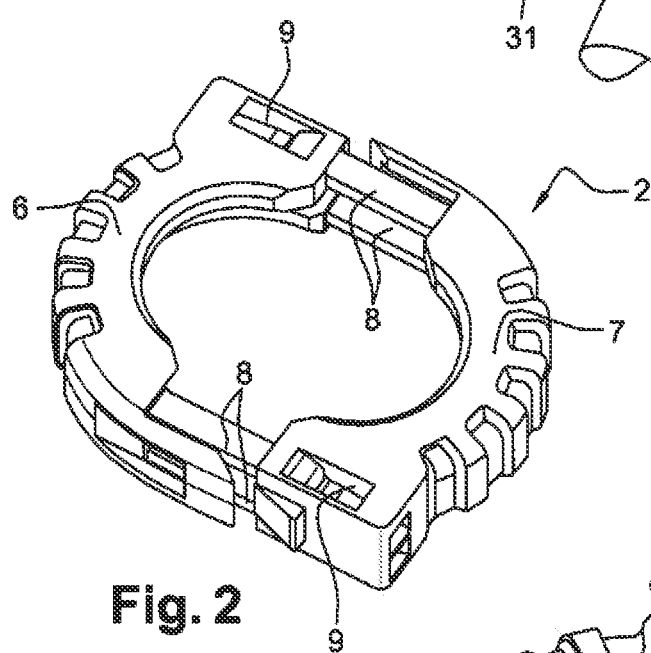
FIG. 2 illustrates a connection part according to the invention, in the open position.
Figure 3:
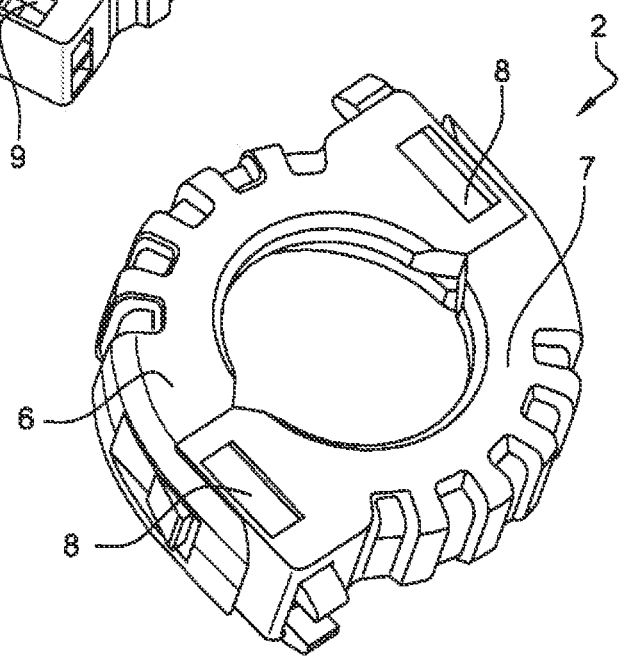
FIG. 3 illustrates a connection part according to the invention, in the closed position.

As illustrated in FIGS. 2 and 3, a connection part 2 according to the invention comprises two connection half parts 6, 7, which are fitted by translation of each part 6, 7 into one another. The two parts 6, 7 can be identical. Each part 6, 7 can be in the form of a half-ring, and comprise an area 15 (FIG. 6) for receipt of at least one element for connection of the two tubes. The receipt area 15 is designed to keep the element for connection of the first tube and the element for connection of the second tube together, in the manner of pliers, for example by thrusting axially towards one another the element for connection of the first tube and the element for connection of the second tube, such as to ensure the connection of the two tubes.

Each part 6, 7 also comprises a male element 8, which can be inserted in a female element 9 of the other part 7, 6, and a female element 9 which can receive the male element 8 of the other part 7, 6. The male element 8 is advantageously arranged at one end of the half-ring 6, 7, whereas the female element 9 is arranged at the other end.

Figure 8:
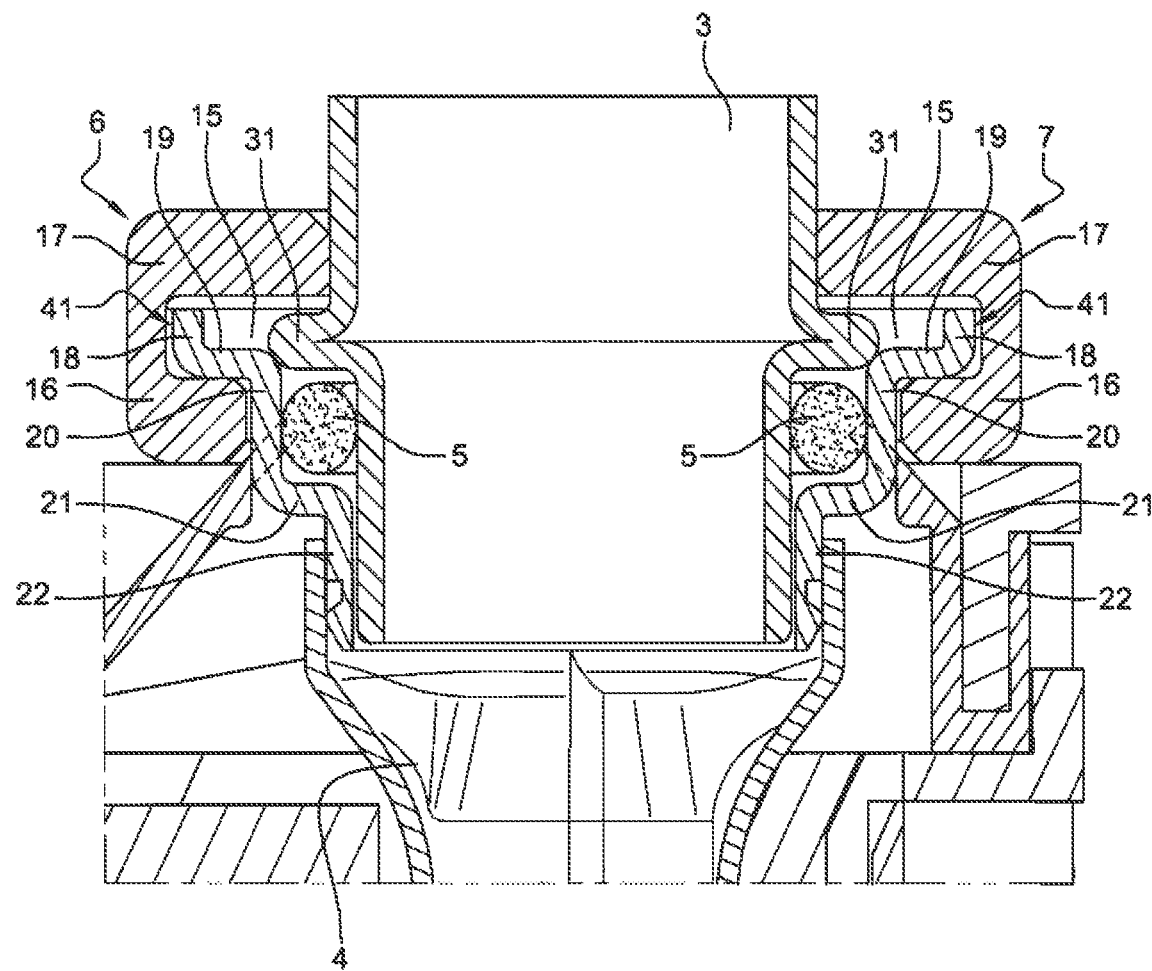
FIG. 8 is a view in longitudinal cross-section of an area of connection of two tubes.

The receipt area 15 is typically a groove formed in each half-ring 6, 7, and in which the element(s) for connection of the tubes, which is/are gripping elements, can be inserted. The elements for connection of the tubes 3, 4 are kept in the receipt area 15. The connection element is typically a collar 41 of one of the two tubes 4 and/or a roll 31 of the other tube 3 (FIG. 8).

In each part 6, 7, the male element 8 can comprise at least one arm which can slide in the female element 9 of the other part 7, 6, said female element 9 being able to be a groove or a guide rail. By way of example, and as illustrated in FIGS. 2 and 3, each part 6, 7 can comprise two arms which slide in two rails of the other part 7, 6.

Thanks to the relative sliding of the two half-rings 6, 7, the connection part 2 is mobile between an open position, in which the part 2 can be pre-positioned on one of the two tubes 3, 4 as illustrated in FIG. 2, and a closed position in which the part 2 ensures the connection of the two tubes 3, 4 as illustrated in FIG. 3.

Figure 4:
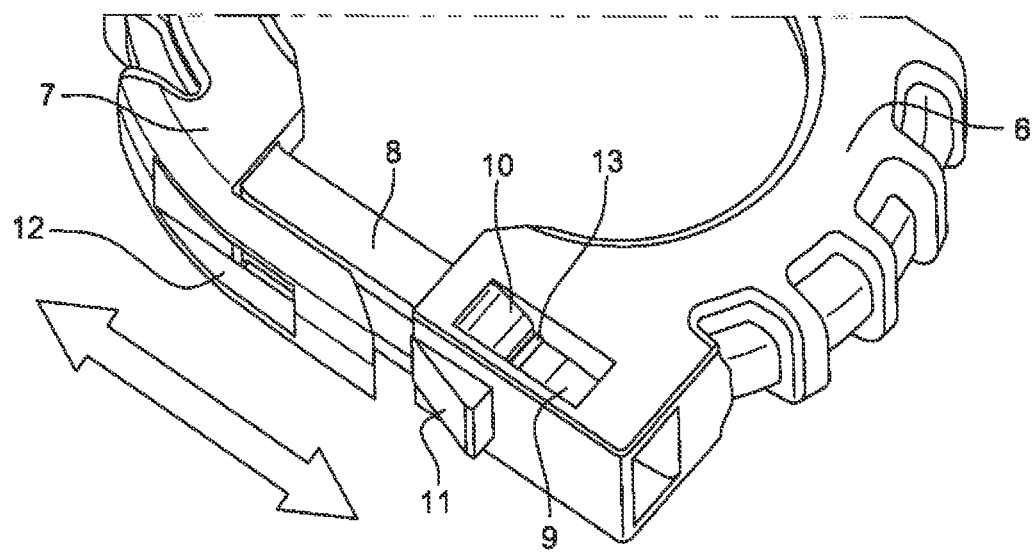
FIGS. 4 and 5 are detailed views of FIG. 2.

The closed position is advantageously ensured by means of clips, for example by means of radial clips (FIGS. 2 to 4). Each male element 8 can thus be provided at its end with a projecting element 10 in the form of a protuberance, in the manner of a clip, which for example has a triangular cross-section in longitudinal cross-section, which is clipped by a return force at the output of the female element 9 in which the male element 8 slides. Similarly, each connection part 6, 7 can also comprise an element 11 which projects from the periphery of the part 6, 7, said projecting element 11 being able for example to have a triangular cross-section in radial cross-section, and which is clipped by means of a return force into an opening in the other part 7, 6. The two connection parts 6, 7 can be provided with notches, thus saving material.

Figure 5:
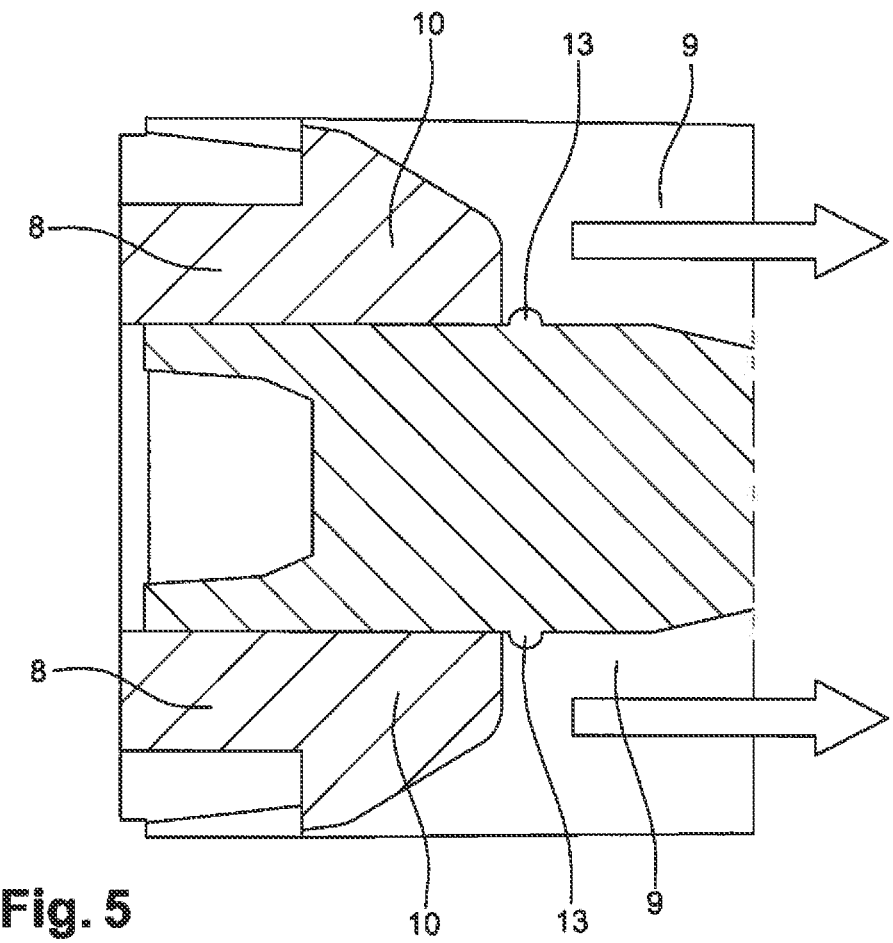

In the embodiment illustrated in FIGS. 4 and 5, a boss or rib 13 is arranged in each guide rail, such as to create an obstacle in the female element 9, which blocks the male element 8, and forces the connection part 2 to be in the open position, thus assisting the pre-positioning of the connection part 2 around the tubes 3, 4. The rib 13 makes it possible to block the clip in the open position, but the user can apply a force such that the male element 8 straddles the rib 13, and is secured in the opening 10 by the return force of the clip. In FIG. 4, the arrows illustrate the direction of locking and unlocking of the part 2. In FIG. 5, the arrows illustrate the trajectories of the clips.

Figure 6:
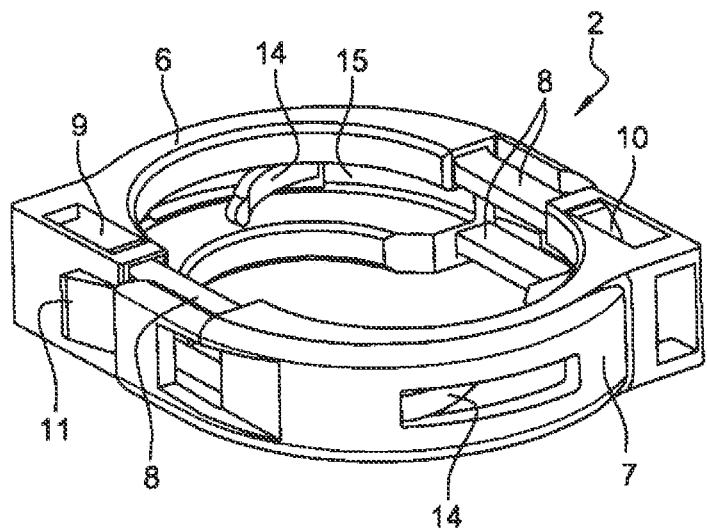
FIG. 6 illustrates the connection part in a variant embodiment.
Figure 7:
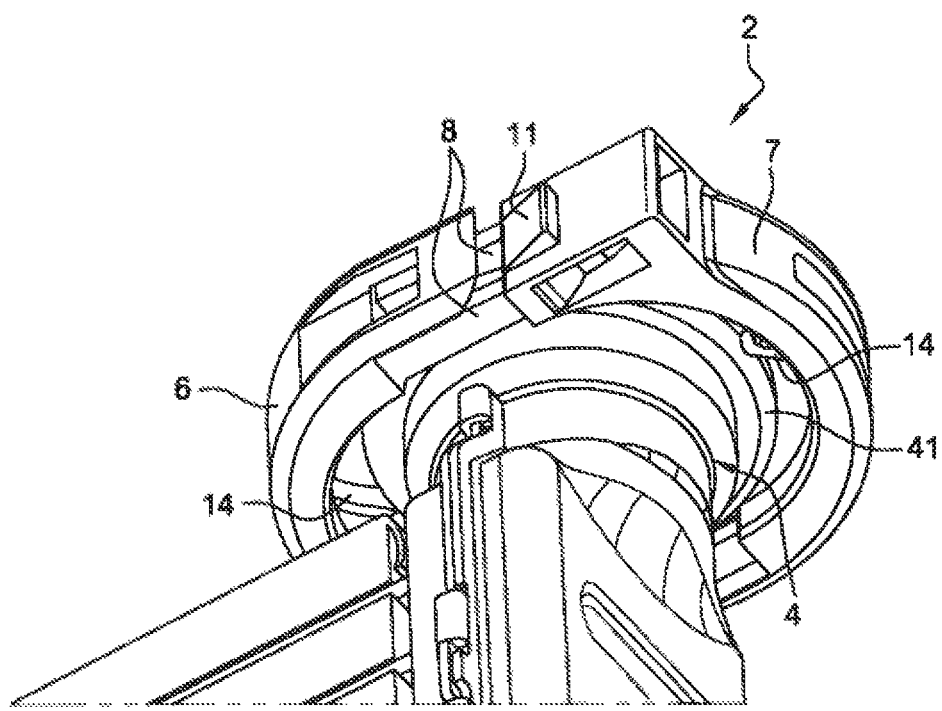
FIG. 7 illustrates a connection device provided with the connection part in FIG. 6.

In the embodiment illustrated in FIGS. 6 and 7, which can be combined with the embodiment in FIGS. 4 and 5, each part 6, 7 of the connection part 2 is provided with a return element 14 in the form of a tongue. The return element 14 can be a flexible element in the form of an arc of a circle, which allows it to be buttressed on an end region of the tubes, typically on an element for connection of one of the two tubes. One of the ends of the return element 14 can be arranged in the area 15 of receipt. The return element 14 permits pre-centering of the two parts 6, 7 on the tubes 3 4 before the locking of the connection part 2. This pre-centering makes it possible to pass the male tube 3 through the two parts 6, 7 without creating an obstacle, if the connection part 2 is offset during its pre-fitting before locking. The return element 14 makes it possible to keep the part 2 in an open position, but force must be applied in order to close the part 2.

FIG. 8 illustrates in longitudinal cross-section the area of connection between the two tubes 3, 4. The area 15 of receipt of the connection part 2 receives the roll 31 of the first tube 3 and the collar 41 of the second tube 4. The area 15 of receipt of the connection part 2 is delimited by a lower border 16 and an upper border 17, which are parallel to one another, and connected by a lateral border which is orthogonal to them. The collar 41 of the second tube 4 can have a cross-section in the form of an "L", with a cylindrical part 18 and an annular part 19, and can be supported via its annular part 19 on the lower border 16 of the connection part 2. The roll 31 of the first tube, for its part, can be supported on the upper border 17 of the connection part, inside the collar 41. The upper border 17 of the connection part 2 is advantageously wider than the lower border 16, such that the upper border 17 is supported on the roll 31, whereas a seal 5 can be arranged below the roll 31 at the lower border 16 of the connection part 2.

The collar 41 of the second tube 4 can be extended by one or a plurality of concentric cylindrical parts 20, 22 and decreasing radii separated by annular parts 19, 21, the profile of the end of the second tube 4 thus having the form of a stairway. From top to bottom, the upper edge 17 of the connection part 2 is thus supported on the roll 31 of the first tube 3, the roll being supported on the seal 5, which itself is supported on the lower annular part 21 of the second tube 2. The upper annular part 19 of the tube 2, which forms part of the collar 41, is for its part supported on the lower border 16 of the connection part 2.

Figure 11:
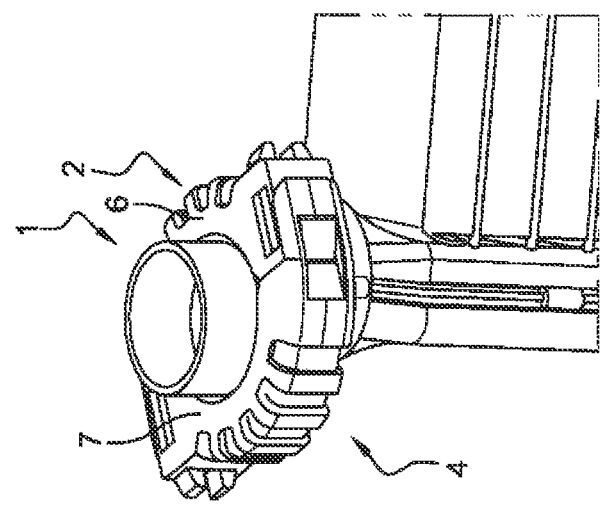
FIGS. 9 to 11 are views in perspective of different steps of a method for coaxial connection of two tubes according to the invention.
Figure 10:
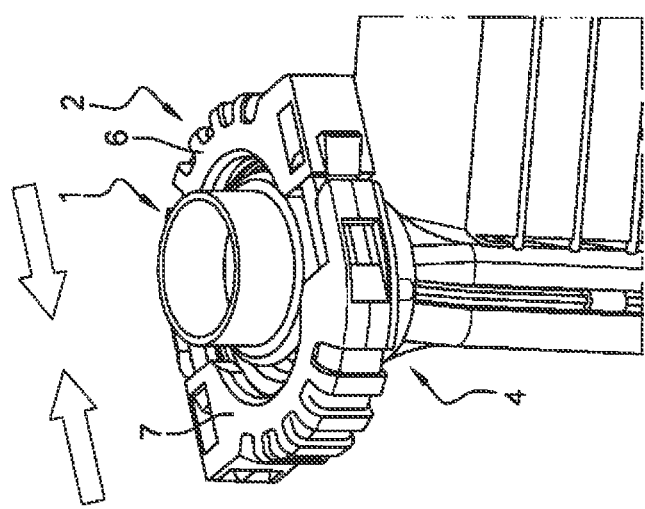
Figure 9:
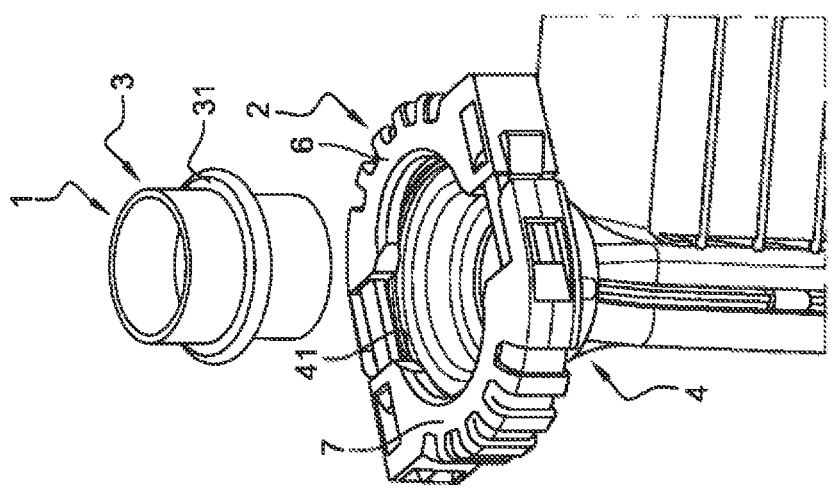

FIGS. 9 to 11 illustrate the different steps of a method for coaxial connection of two tubes according to the invention.

In a first step, as illustrated in FIG. 9, the connection part 2, in its open configuration, is fitted on the second tube 4, which is typically an intake or output tube of a cooling radiator of a motor vehicle, or also a radiator for heating the passenger space of such a vehicle. The connection part 2 is fitted on the collar 41 of the second tube 4, for example by means of radial return elements 14 which are supported on the collar 41 (FIG. 6). The rib 13 makes it possible to block the connection part 2 in the open configuration, whereas the return elements 14 permit the preassembly of the connection part 2 on the second tube 4.

This preassembly makes it possible to insert the first tube 3 easily in the second tube 4, and thus to simplify the connection procedure and make it secure.

Once the first tube 3 is inserted in the second tube 4, the two parts 6, 7 of the connection part 2 are brought towards one another by translation of the two parts 6, in the directions indicated by the arrows (FIG. 10). The process is completed when the two parts 6, 7 of the connection part 2 are clipped into one another, this step being carried out by application of force by the user in order to close everything. Thus, the two parts 6, 7 of the connection part 2 encircle and retain together the roll 31 of the first tube 3 and the collar 41 of the second tube 4, which ensures the connection (FIG. 11).

The invention claimed is:

1. A part for axial connection of two tubes, comprising:
   two connection parts, each provided with an area for receipt of an element for connection of each tube, wherein the two connection parts are configured to slide into one another, between a spaced position of the two connection parts and a tightened position of the two connection parts, in which the two receipt areas hold the connection elements together and form a closed contour;
   wherein each connection part comprises a radial return element configured to pre-position the two connection parts on an end region of the tubes, wherein the radial return elements oppose each other in a direction of relative movement when the two connection parts are slid between the spaced position and the tightened position by retracting into each connection part; and
   wherein the radial return element is flexible.

2. The part as claimed in claim 1, wherein the area for receipt of each connection part is a groove.

3. The part as claimed in claim 1, wherein each connection part is a half-ring, such that in the tightened position the part forms a ring.

4. The part as claimed in claim 3, wherein the areas for receipt of the two connection parts form an annular groove arranged in a radial plane of the part.

5. The part as claimed in claim 4, wherein the groove is delimited by two outer borders which have different radial widths.

6. The part as claimed in claim 1, wherein each connection part comprises a male area which slides in an associated female area of the other part, and a female area in which the male area of the other connection part slides.

7. The part as claimed in claim 6, wherein the male area of each connection part comprises at least one arm which slides in at least one rail of the female area of the other connection part.

8. The part as claimed in claim 7, wherein a boss is arranged in each rail, so as to keep the two connection parts in the spaced position.

9. The part as claimed in claim 1, wherein each connection part is provided with at least one clip, such that the tightened position of the two connection parts is obtained by clipping.

10. The part as claimed in claim 9, wherein each connection part further comprises an element which projects from the periphery of the part, and which is clipped into an opening in the other connection part.

11. The device as claimed in claim 9, further comprising an annular seal.

12. A device for coaxial connection of two tubes, by cooperation of an end region of a first tube with an end region of a second tube, the device comprising two connection parts as claimed in claim 1, which are arranged around elements for connection of the two tubes.

13. The device as claimed in claim 12, wherein, with each tube comprising the connection element, the connection element of the first tube is a roll and the connection element of the second tube is a collar.

14. A method for coaxial connection of two tubes by two connection parts as claimed in claim 1, wherein, in an end region of the two tubes and around the elements for connection of the two tubes, the method comprises:

sliding of the two connection parts, from a spaced position of the two parts, to a tightened position of the two parts, in which the two areas for receipt of the two parts form a closed contour, and keep the connection elements together.

15. The method as claimed in claim 14, wherein, before the step of sliding, the method comprises pre-positioning of the connection part, in the spaced position of the two connection parts, around an end region of one of the two tubes, by each radial return element.

16. A part for axial connection of two tubes, comprising:

two connection parts, each provided with an area for receipt of an element for connection of each tube, wherein the two connection parts are configured to slide into one another, between a spaced position of the two connection parts and a tightened position of the two connection parts, in which the two areas for receipt hold the connection elements together and form a closed contour;

wherein each connection part comprises at least one radial return element configured to pre-position the two connection parts on an end region of the tubes and to retracting into each connection part; and wherein the radial return element is flexible.

* * * * *